Oct. 23, 1934.   C. U. FLANAGAN   1,978,105
COVER FOR AUTOMOBILE STEERING WHEELS OR THE LIKE
Filed July 8, 1933
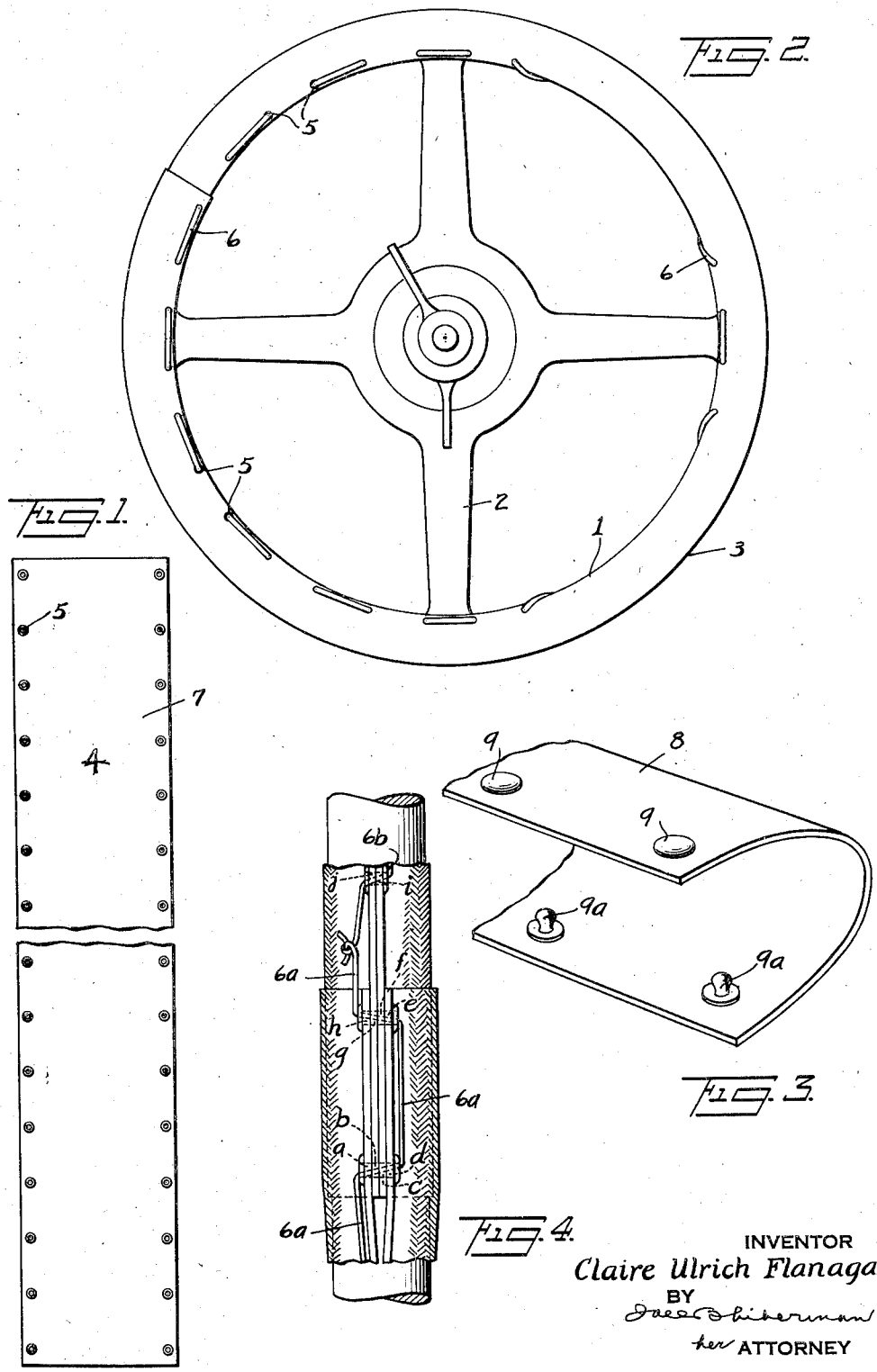
INVENTOR
*Claire Ulrich Flanagan*
BY
her ATTORNEY Patented Oct. 23, 1934

1,978,105

UNITED STATES PATENT OFFICE 1,978,105

COVER FOR AUTOMOBILE STEERING WHEELS OR THE LIKE

Claire Ulrich Flanagan, Larchmont, N. Y.

Application July 8, 1933, Serial No. 679,495

1 Claim. (Cl. 74—558)

The object of the present invention is to provide a cover for automobile or similar steering wheels. It differs from covers heretofore devised in that it is not made of elastic material, and is cut from a rectangular piece of straight cloth which will not slip if adjusted in the manner hereinafter described, and in other features hereinafter enumerated.

The cover can be easily removed for washing and it is a simple matter to readjust it on the steering wheel.

The accompanying drawing shows, for purposes of illustrating the present invention, two embodiments in which the invention may take form, it being understood that the drawing is illustrative of the invention rather than limiting the same.

In this drawing:

Fig. 1 is a plan view of the cover cut from a straight piece of fabric,

Fig. 2 is a plan view of a steering wheel of an automobile or the like with the cover applied and a portion thereof showing a different form of adjustment.

Fig. 3 is a perspective view of a fragment of a cover showing a modification in which snap fasteners are used, and Fig. 4 is an end view of the wheel showing one method of adjusting the terminations of the cover.

In Figs. 1 and 2, 1 is a steering wheel of an automobile or the like of usual form, having spokes 2 and a rim 3. The cover 7 consists of a rectangular piece of cloth 4, as shown in Fig. 1. On each of the long sides of the rectangle is formed a series of eyelets 5. The rectangle of cloth is fastened around the rim of the wheel as shown in Fig. 2. The long sides of the cloth are formed into a tube by means of a lacing 6 which is threaded in and out of the eyelets 5 along the length of the tube.

Different sizes, diameters and thicknesses of the wheel are taken care of by drawing the lacings 6 tighter or looser as the case may be. Variations in the circumference of the wheel are also taken care of in the manner in which the ends of the tube are fastened together. A desirable way is to telescope the ends of the tube, as shown in Fig. 4.

This method is shown in Fig. 4 in which one end is telescoped into the other so that the series of eyelets at one extreme end of the tube are adjacent the series of eyelets before the last at the other end of the tube. Thus the lace $6^a$ passes along one side of the outer sleeve of the tube end; through $a$, the eyelet before the last on such sleeve; through $b$, the eyelet at the adjacent extreme end of the inner sleeve; the lacing $6^a$ is then drawn across the wheel rim through $c$, the opposite eyelet at the extreme end of the inner sleeve; through $d$, the eyelet before the last on the adjacent side of the sleeve, then up the outside of the outer sleeve through $e$, the last eyelet on this side of the outer sleeve; through $f$, the eyelet before the last on the adjacent wall of the inner sleeve, across the rim of the wheel through $g$ and $h$, adjacent eyelets respectively on inner and outer sleeves of the tube as shown; at $h$, the free end $6^a$ of the lace is left for tying. The other end of the lace $6^b$, as it is threaded through the eyelets, finally passes through eyelets $i$ and $j$ leaving the free end of lace $6^b$ to tie with the other free end $6^a$. The circumference of the wheel and the length of the cover will determine how the tube shall be telescoped and the general relation of those eyelets toward the ends of the tube. The free end $6^b$ is then fastened with the other free end $6^a$ in any desired bow or knot. The laces are pulled taut through the length of the wall.

It is sometimes found desirable to twist the cloth in the tube so that the laces are only visible at the spokes. The laces thus pass to the inside of the wheel rim so that the hands of the driver are not hampered by the lacing. This feature is shown in two left hand quadrants of Fig. 2. The lacing around the spokes of the wheel furnish the anchor for the cover and prevent twisting of other portions of the cover along the wheel between the spokes.

Other fastening means may be used in place of the laces, such as snaps or clips, or the like. Snap fasteners are shown in the fragmentary perspective view, Fig. 3. The straight piece of cloth 8 is there finished with snap fasteners 9, $9^a$.

The presence of the cloth cover of the form shown will offer resistance to the slipping of the wheel in the hands, and give a firm grip at all times. It will largely prevent dirt, grease, oil, etc. ordinarily clinging to the rim of the wheel from being spread over the wheel by the hands of the driver. Where gloves are worn by the driver they will not be stained.

The wheel has been described as an automobile steering wheel but the invention can be applied to the steering wheel of boats, aeroplanes, etc.

I claim:

An adjustable cover for an automobile steering wheel or the like comprising a straight piece of non-elastic fabric, rectangular in shape, the edges of the long sides of the rectangle being provided with means for fastening such edges together and into opposed facial abutment to form a continuous substantially tube-like body fitting tightly about the wheel spokes and around the entire circumference of the steering wheel, the edges of the short sides of the rectangle being lapped one over the other for adjusted securement by the fastening means around steering wheels of various circumferences.

CLAIRE ULRICH FLANAGAN.